United States Patent [19]

Hirozawa et al.

[11] 4,234,440
[45] Nov. 18, 1980

[54] HYDROXYBENZOIC ACID AS PH BUFFER AND CORROSION INHIBITOR FOR ANTIFREEZE CONTAINING ORGANOSILICONE-SILICATE POLYMERS

[75] Inventors: Stanley T. Hirozawa, Birmingham, Mich.; Edward F. O'Brien, Cromwell, Conn.; Joe C. Wilson, Belleville, Mich.

[73] Assignee: BASF Wyandotte Corporation, Wyandotte, Mich.

[21] Appl. No.: 349

[22] Filed: Jan. 2, 1979

[51] Int. Cl.$^2$ .............................................. C09K 15/32
[52] U.S. Cl. ........................................ 252/76; 252/73; 252/75; 252/77; 252/78.1; 252/78.3; 252/389 R; 252/396; 422/14; 422/7; 422/17
[58] Field of Search ....................... 252/75, 76, 77, 73, 252/78.1, 78.3, 389 R; 422/14, 7, 13, 17

[56] References Cited

U.S. PATENT DOCUMENTS

| | | | |
|---|---|---|---|
| 2,094,564 | 9/1927 | Schenck et al. | 252/73 |
| 3,198,820 | 8/1968 | Pines et al. | 252/75 |

*Primary Examiner*—Mayer Weinblatt
*Attorney, Agent, or Firm*—Andrew E. Pierce

[57] ABSTRACT

This invention relates to single-phase antifreeze or coolant concentrates comprising an alcohol, a silicone-silicate copolymer and an organic basic pH buffer and corrosion inhibitor comprising a hydroxybenzoic acid or mixtures thereof. The concentrates are preferably used as coolants either undiluted or upon dilution with about 30 to about 90 percent by weight of water based upon the total weight of the coolant. The alcohol is preferably ethylene glycol. The coolant compositions are especially effective in inhibiting the corrosion of aluminum internal combustion engine and radiator components.

7 Claims, No Drawings

HYDROXYBENZOIC ACID AS PH BUFFER AND CORROSION INHIBITOR FOR ANTIFREEZE CONTAINING ORGANOSILICONE-SILICATE POLYMERS

BACKGROUND OF THE INVENTION

1. Field of the Invention

This invention relates to alcohol based antifreeze and coolant compositions containing corrosion inhibitors for use primarily in water-circulating systems such as internal combustion engines, heat exchangers, cooling towers, and the like.

2. Description of the Prior Art

Antifreeze concentrates containing alcohols such as ethylene glycol are commonly diluted with water to prepare cooling system compositions for internal combustion engines in order to depress the freezing point of water. It is known that the alcohols utilized gradually decompose in the cooling system to produce acidic products which lower the pH of the coolant. It is also known that metallic surfaces in internal combustion engines which are in contact with such coolants become seriously corroded and that the corrosion becomes progressively worse as the pH of the coolant decreases. The recent tendency toward the use of aluminum in internal combustion engines, for instance, aluminum cylinder heads, aluminum water pumps and aluminum radiator cores, requires improved corrosion resistant antifreeze compositions which are capable of retarding the corrosion of metals which are in contact with such coolants.

It has also been recognized in the art that corrosion resistant antifreeze compositions are most desirably single-phase systems which have good shelf stability such that when such concentrates reach the consumer prior to dilution with water to form the coolant composition, such compositions contain the proper proportion of each phase and exhibit no gelation.

Numerous antifreeze compositions are known in the art which contain corrosion inhibitors and inhibitors for preventing decomposition of the alcohol utilized, for instance, ethylene glycol. These corrosion inhibitors and stabilizers for alcohol decomposition include both organic materials and inorganic materials. Illustrative of the organic materials that have been used in antifreeze compositions are guanadine, citrates, coal tar derivatives, petroleum bases, thiocyanates, peptones, phenols, thioureas, tannin, quinoline, morpholine, triethanolamine tartrates, glycol mono-ricinoleate, organic nitrites, mercaptans, sulfonated hydrocarbons, fatty oils, triazoles, mercaptobenzothiazoles, phenothiazine, and piperazine. Illustrative of the inorganic materials that have been used as corrosion inhibitors are sulfates, sulfides, fluorides, hydrogen peroxide, alkali metal chromates, nitrites, phosphates, borates, tungstates, molybdates, carbonates, and silicates.

Silicates, particularly alkali metal silicates and certain silicones and silicate-silicone copolymers, have been suggested for use in antifreeze compositions to retard the corrosion of metal surfaces of internal combustion engines as disclosed in U.S. Pat. Nos. 3,341,469; 3,337,496; 3,312,622; 3,198,820; 3,203,969; 3,248,329; 3,265,623; 3,121,692; and others. While it has been found that compositions containing metal silicates are effective corrosion inhibitors for metals in internal combustion engines, especially aluminum, the use of metallic silicates in antifreeze compositions is disadvantageous since these compositions have poor shelf life and/or use life, that is, a tendency to gel and form precipitates on standing prior to dilution of antifreeze concentrates by the consumer or during use as a coolant. With respect to the water-soluble organo-silicones and water-soluble silicate-silicone copolymers which have been suggested for use in antifreeze compositions, it has been found that it would be desirable in such system if greater reserve alkalinity could be incorporated into the system thereby reducing the corrosion tendency.

In U.S. Pat. No. 2,832,742, there is disclosed an ethylene glycol base coolant for use in automobile radiators containing a corrosion inhibiting composition composed of equal parts of para tertiary butylbenzoic acid and a high molecular weight aliphatic carboxylic acid derived from a petroleum fraction. In U.S. Pat. No. 2,197,774 there is disclosed the use of aromatic nitrohydroxy compounds wherein the nitro and hydroxy groups are directly attached to the aromatic nucleus or positioned only on a side chain. In Canadian Pat. No. 990,060 there is disclosed ethylene glycol based antifreeze compositions containing alkali metal silicates and alkali metal nitrites as corrosion inhibitors which are buffered at a pH of about 9 to about 10.5. There is no indication in any of these references that a hydroxybenzoic acid, such as para hydroxybenzoic acid or mixtures thereof are effective pH buffers and corrosion inhibitors in such systems.

SUMMARY OF THE INVENTION

There are disclosed single-phase antifreeze and coolant concentrates comprising an alcohol selected from the group consisting of methanol, ethanol, propanol, ethylene glycol, diethylene glycol, triethylene glycol, propylene glycol and glycerol and a corrosion inhibiting amount of a water-soluble silicone-silicate polymer and, as an organic basic pH buffer, a hydroxybenzoic acid or mixtures thereof.

Preferably said alcohol is ethylene glycol and preferably the antifreeze concentrates are utilized as coolants upon dilution with water in internal combustion engines including those engines containing aluminum parts, for instance, aluminum cylinder heads. By the incorporation of the hydroxybenzoic acid of the invention into antifreeze compositions containing alkali metal silicate-silicone copolymers, the tendency for these silicone-silicate corrosion inhibitors to suffer a loss in reserve alkalinity can be overcome. The organic pH buffers and corrosion inhibitors of the invention are especially advantageous as compared to the inorganic sodium borates and potassium borates.

DESCRIPTION OF THE PREFERRED EMBODIMENTS

The compositions of this invention contain an organic basic pH buffer which is a hydroxybenzoic acid preferably ortho hydroxybeznoic acid, para hydroxybenzoic acid and mixtures thereof. The meta form as well as the dihydroxybenzoic acids, i.e., 2,6- and 2,4-dihydroxybenzoic acids are also useful. The use of such buffers serves to maintain the pH of the antifreeze or coolant composition above a pH of about 9 to about 11, preferably a pH above about 9.5 to 10.5 in order to minimize corrosion which increases with the decreasing pH of the antifreeze system. Additionally, where a water-soluble metal silicate-organo silicone copolymer is utilized as a component of the antifreeze composition, the buffering of the pH by the hydroxybenzoic acid buffering compounds of the invention serves to maintain the reserve alkalinity of the system. While many basic buffers have been used in the past in antifreeze compositions to maintain the pH above 7, the preferred borate salt buffers of the prior art such as sodium tetraborate, sodium orthoborate, and sodium metaborate are ineffective in maintaining reserve alkalinity during use where the antifreeze composition contains water-soluble organosilicone-alkali metal silicate copolymers.

The amount of the hydroxybenzoic acid basic pH buffer and corrosion inhibitors utilized in the compositions of the invention depends to some extent upon the desired shelf life of the antifreeze concentrate containing the buffer, the effectiveness of the particular hydroxybenzoic acid selected, and the proportions of the other components of the antifreeze concentrate composition. Generally, amounts of the hydroxy-benzoic acid compositions of the invention range from about 0.1 percent to about 1.5 percent by weight, preferably about 0.5 percent to about 1.2 percent by weight based upon the weight of the alcohol used in the antifreeze concentrates of the invention. The use of lesser amounts of the basic pH buffers of the invention can result in a significant decrease in the pH of the coolant in a relatively short use time whereas the use of greater amounts of the basic pH buffer can involve the expenditure of needless amounts of money and possibly lead to insolubility problems. No advantage is generally gained by departing from the indicated proportions or from the use of additional basic pH buffer materials known in the prior art.

The alcohols that are suitable for use in preparing the antifreeze and cooling compositions of the invention include both monohydric alcohols and polyhydric alchols. Thus, methanol, ethanol, and propanol as well as ethylene glycol, diethylene glycol, triethylene glycol, propylene glycol and glycerol are useful. Mixtures of these alcohols are also useful in the compositions of this invention. Ethylene glycol is an especially useful alcohol. The alcohol and coolant concentrates of the invention are useful undiluted as a heat transfer medium in the cooling systems of internal combustion engines or upon dilution with relatively large amounts of water.

The antifreeze concentrates of the invention are adapted to economical shipment and storage; the concentrate being shipped to the point where it is to be used in diluted form as a coolant. Water imparts desirable properties to both the concentrate and coolant compositions of the invention since small amounts of water tend to lower the freezing point of the concentrate composition and large amounts of water improve the heat transfer properties of the coolant compositions. The antifreeze concentrate compositions of the invention can contain about 0.1 percent by weight to about 10 percent by weight of water based upon the weight of the concentrate. Preferably, the concentrates contain about 2 to about 5 percent of water based upon the weight of the alcohol. Generally the coolant compositions contain about 30 percent to about 90 percent by weight of water based upon the weight of the alcohol. The pH of both the antifreeze concentrate compositions of the invention and the coolants diluted with the above larger amounts of water generally used in preparing the coolant compositions should be maintained at greater than about 9 to about 11 in order that corrosion of metals with which the compositions come in contact will be minimized. Any alkali such as an alkali metal hydroxide can be used to adjust pH.

Various additives known in the prior art can be added to the antifreeze concentrate compositions of the invention or to the coolant compositions in order to impart special properties thereto. For instance, antifoam agents, identifying dyes, pH indicators, conventional corrosion and alcohol or glycol oxidation inhibitors known in the prior art, sealants which prevent leakage of the coolant from the coolant system, anticreep agents which prevent seepage of the coolant into the crankcase of the internal combustion engine and the like can be added to either or both the antifreeze concentrates of the invention or the diluted coolant compositions of the invention. It should be noted that, while the antifreeze and coolant compositions of this invention are single-phase compositions, the addition of various additives insoluble in the alcohol or in water can render these compositions two-phase (for instance, the addition of an insoluble sealant additive which prevents leakage of the coolant from the cooling system). While the antifreeze concentrates and coolant compositions of this invention are particularly suitable for use either alone or upon dilution with water as coolants suitable for use in the cooling system of an internal combustion engine, the compositions can be advantageously employed in other applications such as heat transfer fluids or hydraulic fluids.

Silicone-silicate copolymers useful in the preparation of the antifreeze concentrate compositions of the invention are generally used in the amount of 0.01 percent to 10 percent by weight of said concentrates. Said copolymers consist essentially of:

(A) from 10 to 90 parts by weight of siloxane groups represented by the formula:

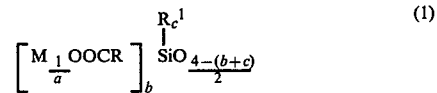
(1)

wherein M is a cation that forms a water-soluble silicate selected from the group consisting of the sodium, potassium, lithium, rubidium and tetra(alkyl)ammonium cations, a is the valence of the cation represented by M and is an integer having a value of at least one, R is a member selected from the group consisting of the unsubstituted divalent hydrocarbon groups,

and substituted divalent hydrocarbon groups, each
$M_{1/a}OOC$ group is connected to the silicon atom through at least 2 carbon atoms of the group represented by R, $R^1$ is a monovalent hydrocarbon group, b is an integer having a value from 1 to 3 inclusive, c is an integer having a value from 0 to 2 inclusive and (b+c) have a value from 1 to 3 inclusive and (B) from 10 to 90 parts by weight of groups represented by the formula:

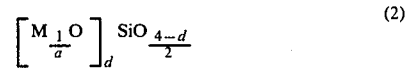
(2)

wherein M and a have the above-defined meanings and d is an integer having a value from 1 to 3 inclusive, said parts by weight of said groups being based upon 100 parts by weight of the organosilicone polymer.

In addition to the siloxane groups represented in the above generic formula (1), the organosilicone-silicate polymers utilized in the antifreeze concentrates of the invention also can contain siloxane groups represented by the formula:

$$R''_e SiO_{\frac{4-e}{2}} \qquad (3)$$

wherein R'' is an unsubstituted monovalent hydrocarbon group or an amino-substituted monovalent hydrocarbon group containing one amino group and e is an integer having a value of from 0 to 3 inclusive. Generally said polymers contain from 10 to 80 parts by weight of siloxane groups represented by the formula (1), 10 to 80 parts by weight of the groups represented by formula (2) and 10 to 80 parts by weight of groups represented by formula (3).

Methods of preparation and representative compounds within the above formulas can be found in U.S. Pat. No. 3,198,820 and U.S. Pat. No. 3,312,622, both incorporated herein by reference.

The reserve alkalinity of an antifreeze composition as referred to elsewhere in the specification is defined as a measure of the ability of the antifreeze composition to resist or decrease in pH due to the presence of acidic materials such as are produced by the decomposition of ethylene glycol. Reserve alkalinity is determined by titrating a sample (about 10 cc) of the composition with 0.1 Normal aqueous hydrochloric acid solution. The reserve alkalinity is computed by calculating the number of milliliters of acid that would be required to neutralize 100 milliliters of the composition from the number of milliliters of acid actually required to neutralize the sample.

When not otherwise specified throughout this specification and claims, temperatures are given in degrees centigrade and parts, percentages and proportions are by weight.

The embodiments of the invention in which an exclusive property or privilege is claimed are defined as follows:

1. A single-phase antifreeze and coolant concentrate consisting essentially of an alcohol selected from the group consisting of methanol, ethanol, propanol, ethylene glycol, diethylene glycol, triethylene glycol, propylene glycol and glycerol, an organosilicone-silicate polymer corrosion inhibitor and a hydroxybenzoic acid pH buffer and corrosion inhibitor composition capable of buffering the pH in the range of above about 9 to about 11, wherein said pH buffer is selected from the group consisting of ortho hydroxybenzoic acid, para hydroxybenzoic acid, and mixtures thereof and is present in the amount of about 0.1 to about 1.5 percent by weight based upon the weight of said antifreeze, wherein said organo-silicone-silicate polymer corrosion inhibitor is present in an amount of 0.01 percent to 10 percent by weight of said concentrate, and wherein said polymer consists essentially of:
(A) from 10 to 90 parts by weight of siloxane groups represented by the formula:

$$\left[ M_{\frac{1}{a}}OOCR \right]_b SiO_{\frac{4-(b+c)}{2}}^{R_c^1} \qquad (I)$$

wherein M is a cation that forms a water-soluble silicate selected from the group consisting of the sodium, potassium, lithium, rubidium and tetra(alkyl)ammonium cations, a is the valence of the cation represented by M and is an integer having a value of at least one, R is a member selected from the group consisting of the unsubstituted divalent hydrocarbon groups, $M_{1/a}OCC$ substituted divalent hydrocarbon groups, each $M_{1/a}OCC$ group is connected to the silicon atom through at least 2 carbon atoms of the group represented by R, $R^1$ is a monovalent hydrocarbon group, b is an integer having a value from 1 to 3 inclusive, c is an integer having a value from 0 to 2 inclusive and (b+c) have a value from 1 to 3 inclusive and
(B) from 10 to 90 parts by weight of groups represented by the formula:

$$\left[ M_{\frac{1}{a}}O \right]_d SiO_{\frac{4-d}{2}} \qquad (II)$$

wherein M and a have the above-defined meanings and d is an integer having a value from 1 to 3 inclusive, said parts by weight of said groups being based on 100 parts by weight of the organosilicone-silicate polymer.

2. The composition of claim 1 wherein said alcohol is ethylene glycol and said pH buffer is para hydroxybenzoic acid and said concentrate contains about 0.1 percent to about 10 percent by weight of water all based upon the weight of the composition.

3. A coolant composition consisting essentially of the antifreeze of claim 2 and about 30 percent to about 90 percent by weight of water based upon the weight of the alcohol.

4. The composition of claim 1 wherein said organo-silicone-silicate polymer additionally contains siloxane groups represented by the formula:

$$R_e'' SiO_{\frac{4-e}{2}} \qquad (III)$$

wherein R'' is an unsubstituted monovalent hydrocarbon group or an amino-substituted monovalent hydrocarbon group containing one amino group and e is an integer having a value of from 0 to 3 inclusive.

5. The composition of claim 4 wherein said organosilicone-silicate polymer has from 10 to 80 parts by weight each of groups represented by formulas I, II, and III, said parts being based upon 100 parts by weight of the organo-silicone-silicate polymer.

6. The composition of claim 5 wherein said alcohol is ethylene glycol, said pH buffer is para hydroxybenzoic acid and said concentrate contains about 0.1 percent to about 10 percent by weight of water all based upon the weight of the composition.

7. A coolant composition consisting essentially of the antifreeze of claim 6 and about 30 percent to about 90 percent by weight of water based upon the weight of the alcohol.

* * * * *